(12) United States Patent
Sheff et al.

(10) Patent No.: US 11,919,601 B2
(45) Date of Patent: Mar. 5, 2024

(54) ERGONOMIC BICYCLE HANDLEBAR AND CYCLING SYSTEMS

(71) Applicant: COEFFICIENT CYCLING LLC, Redwood City, CA (US)

(72) Inventors: Donald A. Sheff, Redwood City, CA (US); Rick D. Sutton, Salinas, CA (US); Damon Campbell, Pacific Grove, CA (US); William L Nighan, Portola Valley, CA (US)

(73) Assignee: COEFFICIENT CYCLING LLC, Redwood City, CA (US)

( * ) Notice: Subject to any disclaimer, the term of this patent is extended or adjusted under 35 U.S.C. 154(b) by 0 days.

(21) Appl. No.: 17/782,605

(22) PCT Filed: Dec. 4, 2020

(86) PCT No.: PCT/US2020/070850
§ 371 (c)(1),
(2) Date: Jun. 3, 2022

(87) PCT Pub. No.: WO2021/113869
PCT Pub. Date: Jun. 10, 2021

(65) Prior Publication Data
US 2023/0011513 A1    Jan. 12, 2023

Related U.S. Application Data

(60) Continuation-in-part of application No. 17/353,426, filed on Jun. 21, 2021, now Pat. No. 11,505,275, which is a continuation-in-part of application No. 16/548,703, filed on Aug. 22, 2019, now Pat. No. 11,040,752, which is a division of application No. 16/024,508, filed on Jun. 29, 2018, now Pat. No.
(Continued)

(51) Int. Cl.
*B62K 21/12* (2006.01)
*B62J 11/00* (2020.01)

(52) U.S. Cl.
CPC .............. *B62K 21/12* (2013.01); *B62J 11/00* (2013.01)

(58) Field of Classification Search
CPC .......... B62K 21/12; B62K 21/125; B62J 7/06; B62J 9/21
See application file for complete search history.

(56) References Cited

U.S. PATENT DOCUMENTS

| | | |
|---|---|---|
| 4,445,396 A | 5/1984 | Shimano |
| 4,503,729 A | 3/1985 | Shimano |

(Continued)

FOREIGN PATENT DOCUMENTS

| | | | | |
|---|---|---|---|---|
| EP | 2860095 A1 | * | 4/2015 | ............ B62K 21/125 |
| GB | 2502599 A | * | 12/2013 | ............. B62K 21/12 |

*Primary Examiner* — Thomas C Diaz
(74) *Attorney, Agent, or Firm* — James E. Eakin

(57) ABSTRACT

An ergonomic and aerodynamic bicycle handlebar system having appropriate sweep angles and slope angles, embodiments of which can vary both for the type of application and the width of the bar, provides improved energy efficiency, comfort and increased center of gravity control. Flare angle and drop angle can also be adjusted for particular applications. The handlebar may be made of carbon fiber or other suitable materials. Various alternative embodiments are disclosed for drop handlebars and mountain bike handlebars.

26 Claims, 13 Drawing Sheets

Related U.S. Application Data 10,392,073, which is a continuation-in-part of application No. 15/097,374, filed on Apr. 13, 2016, now abandoned.

(60) Provisional application No. 62/943,774, filed on Dec. 4, 2019, provisional application No. 63/009,988, filed on Apr. 14, 2020.

(56) References Cited

U.S. PATENT DOCUMENTS

| | | | |
|---|---|---|---|
| 4,829,847 A | 5/1989 | Modolo | |
| 5,083,476 A | 1/1992 | Borromeo | |
| 5,226,341 A * | 7/1993 | Shores | B62K 21/125 |
| | | | 74/551.8 |
| 5,390,564 A | 2/1995 | Klieber | |
| 5,423,728 A * | 6/1995 | Goldberg | A63B 22/0605 |
| | | | 482/57 |
| 5,782,139 A * | 7/1998 | Fraiman | B62K 21/12 |
| | | | 74/551.1 |
| 6,086,161 A | 7/2000 | Luttgeharm | |
| D727,132 S | 4/2015 | D'Aluisio | |
| D844,513 S * | 4/2019 | Izaz | D12/178 |
| 2004/0045132 A1* | 3/2004 | Chen | B62K 21/12 |
| | | | 16/430 |
| 2005/0109150 A1* | 5/2005 | Chiang | B62K 21/12 |
| | | | 74/551.1 |
| 2005/0109151 A1* | 5/2005 | Chiang | B62K 21/125 |
| | | | 74/551.1 |
| 2007/0137409 A1* | 6/2007 | Laivins | B62K 21/12 |
| | | | 74/551.9 |
| 2013/0020362 A1* | 1/2013 | Luomanen | B62K 19/46 |
| | | | 224/420 |
| 2013/0026815 A1 | 1/2013 | Smart | |
| 2013/0113269 A1 | 5/2013 | Katsanis | |
| 2016/0263938 A1 | 9/2016 | Lew | |
| 2017/0232790 A1 | 8/2017 | Hall | |
| 2018/0117958 A1 | 5/2018 | Macris | |
| 2018/0304956 A1* | 10/2018 | Sheff | B62K 21/12 |

* cited by examiner

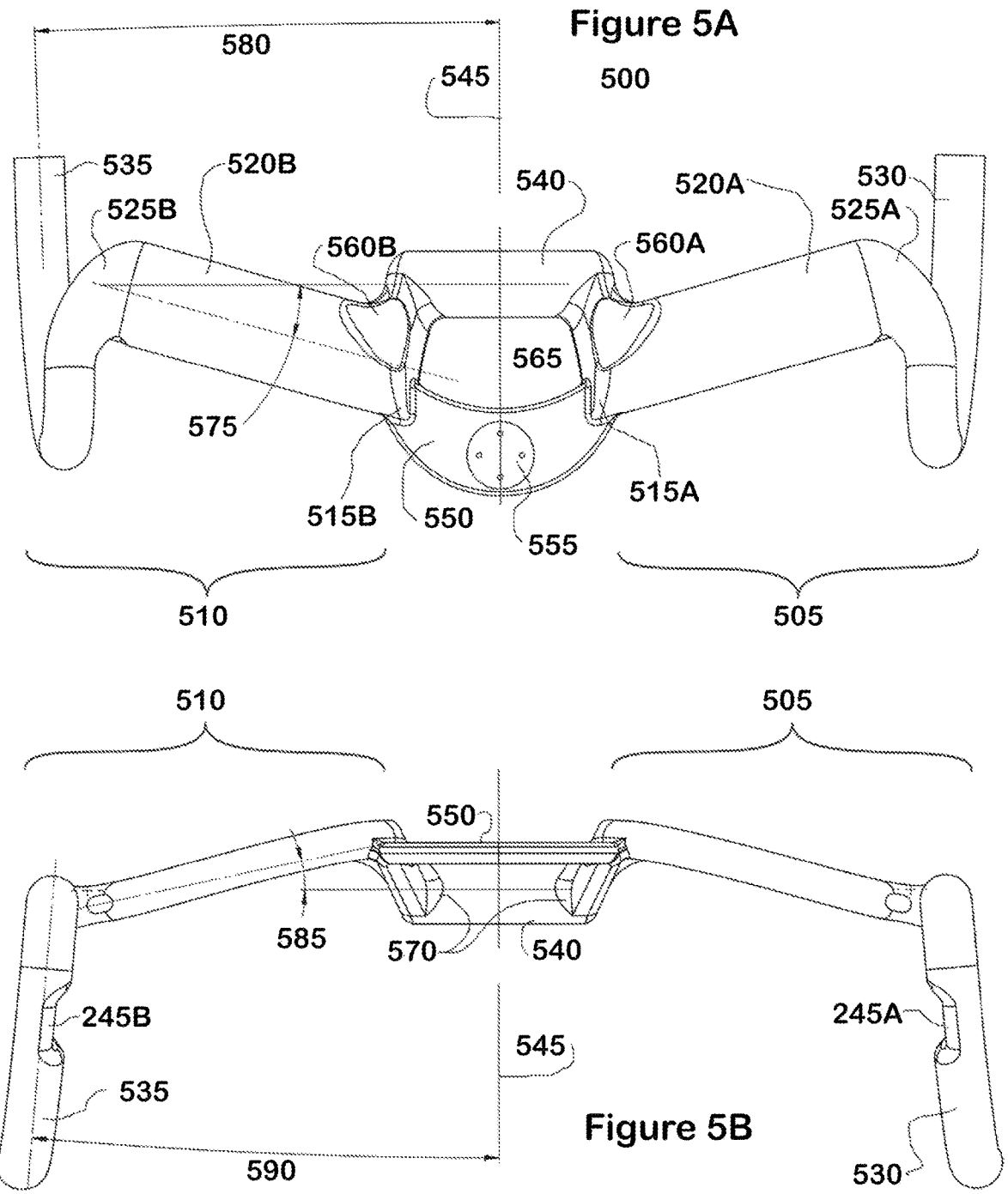

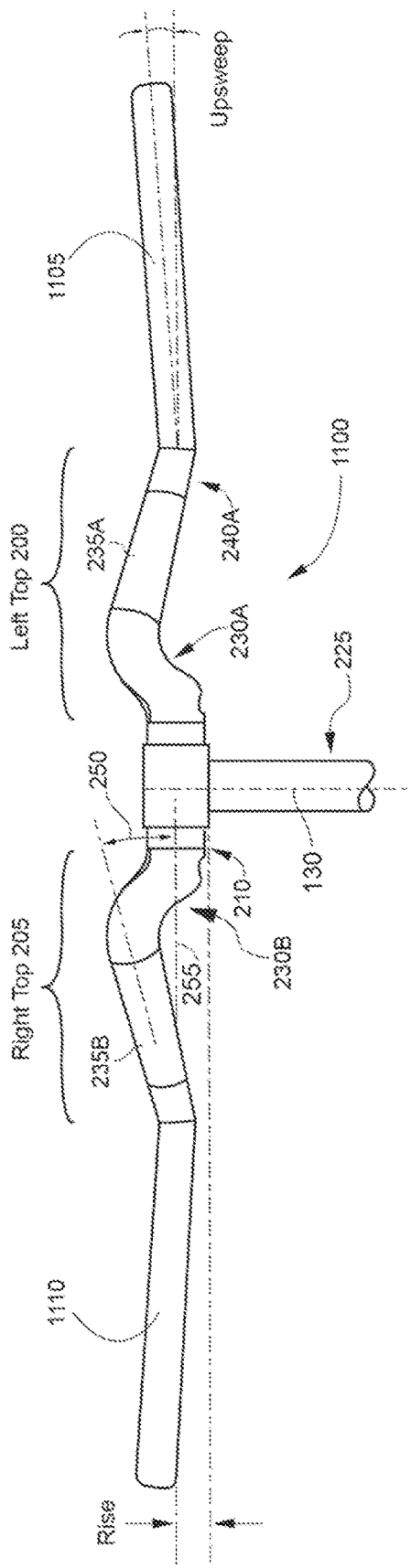
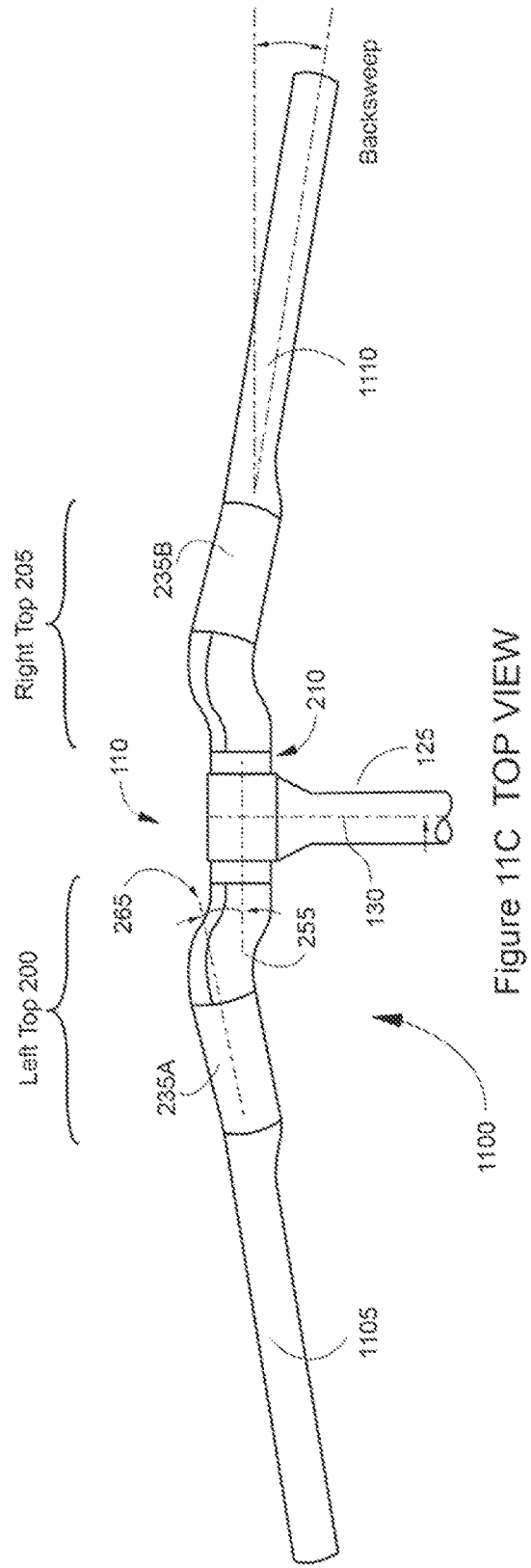

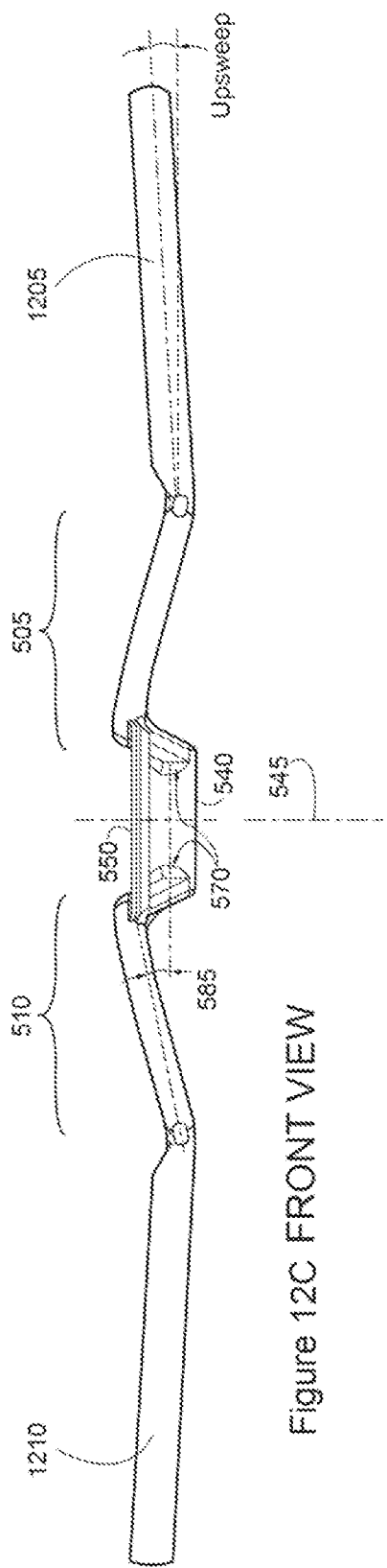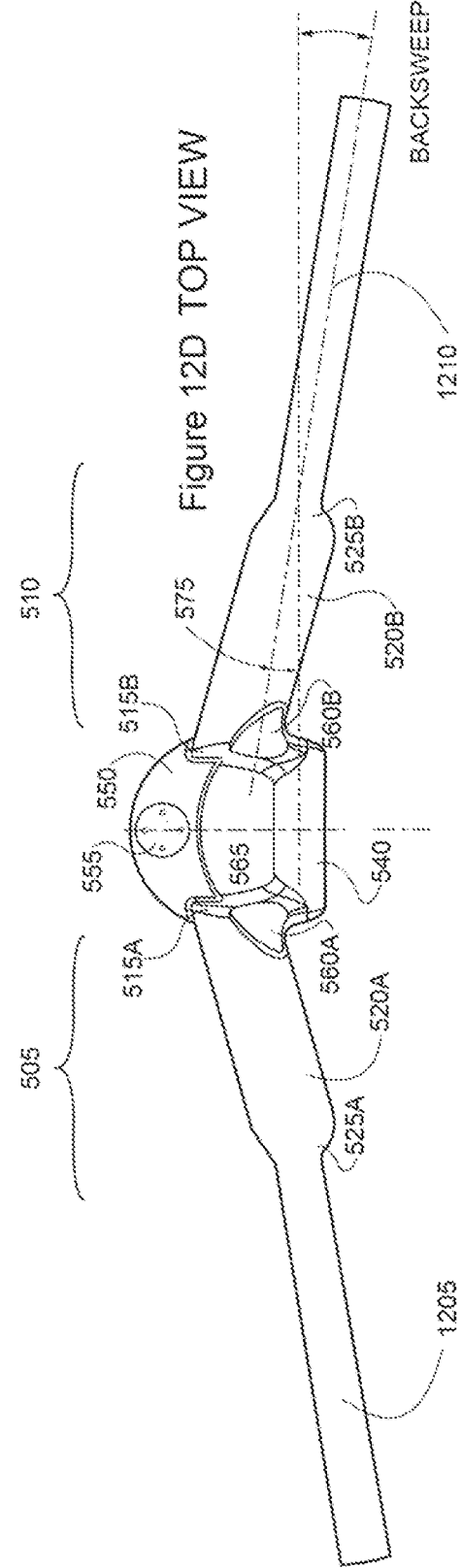

ERGONOMIC BICYCLE HANDLEBAR AND CYCLING SYSTEMS

RELATED APPLICATIONS

The present application is conversion of U.S. Patent Application Ser. No. 63/009,988 filed Apr. 14, 2020, and is further a conversion of U.S. Patent Application Ser. No. 62/943,774 filed Dec. 4, 2019, which in turn is a CIP of U.S. patent application Ser. No. 16/548,703 filed Aug. 22, 2019, which in turn is a continuation-in-part of U.S. patent application Ser. No. 16/024,508, filed Jun. 29, 2018, now U.S. Pat. No. 10,392,073 B2 issued Aug. 27, 2019. U.S. Pat. No. 10,392,073 B2 is a Continuation-in-Part of U.S. patent application Ser. No. 15/097,374, filed Apr. 13, 2016. The present application claims the benefit of each of the foregoing, the entire contents of each of which are incorporated herein by reference for all purposes.

FIELD OF THE INVENTION

The present invention relates generally to the field of bicycle handlebars and more particularly relates to bicycle handlebars that facilitate ergonomic and aerodynamic rider positions as well as reduced fatigue and physiological stress.

The following discussion includes information that may be useful in understanding the present invention. No admission is made that any of this information is prior art to, or material to, the inventions or that any publication or document that is specifically or implicitly referenced herein is prior art.

Cyclists, especially competitive cyclists, look for every advantage they can gain with their equipment. Bicyclists seek to maximize efficiency while minimizing the risk of injury. Equipment optimization is an aspect of this goal. Improper mechanics decrease efficiency and can cause strain and fatigue. Poorly designed handlebars encourage the cyclist into the wrong position. Wrong positioning can increase wind resistance and fatigue the cyclist. Poor body position also impacts the cyclist's breathing. Improper arm and shoulder alignment constricts the lungs and prevents them from functioning at full capacity. This puts the cyclist at a competitive disadvantage or at least loses a potential benefit. Moreover, in case of a crash, proper arm, elbow and shoulder position may in some instances help to limit or possibly even avoid injury.

Unfortunately, prior art bicycle handlebars have not provided the desired positioning. One common, traditional handlebar design is essentially a straight bar, which, when gripped by a cyclist, forces the hands into an overhand position, also referred to as a prone grip. When the bicycle handlebar is held with a prone grip, the palm faces away from the body. With the hands gripping a conventional straight bar, the wrist is forced into an unnatural angle that in turn forces the elbows out and the shoulders forward.

The top portion of conventional drop handlebars, such as used on some traditional designs of track and road bikes, comprise a substantially horizontal bar with a generally U-shaped downward portion affixed at each end. Again the straight portions force the wrists into uncomfortable angles that stress the joints and push the elbows away from alignment with the torso. While the drop portions may provide improved alignment of the hands and arms with the torso, gripping the drop portions forces the torso into a bent-over position that is also fatiguing.

What has been missing is a bicycle handlebar system that provides a user with comfort, safety, and control, operates reliably, and can be manufactured economically. Thus there has been a long-felt need for a bicycle handlebar system that ensures comfort, safety, and control.

The present invention overcomes the limitations of the prior art by providing a bicycle handlebar system that causes proper positioning of the hands, arms, elbows and shoulders while riding with the hands atop the bars. Improved hand, elbow and shoulder positioning allows a more relaxed and energy-saving body position by reducing stress. In addition, such improved positioning reduces the cyclist's cross-section, and may in some circumstances reduce the chance or severity of physical injury. Proper hand and elbow placement reduces the lost energy that results from a "side-to-side" motion while pedaling.

The engineered shape of the handlebars of the present invention position the upper body of the rider to maximize ergonomics for the rider, to minimize air resistance, and to minimize injuries to the rider in the event a crash occurs. In an embodiment, the bicycle handlebars of the present invention comprise a top bar section with a stem clamp area disposed between a left top bar section and a right top bar section. In at least some embodiments, thumb indexes such as flattened indexes are formed into the drop portion of the handlebar. In at least some embodiments, the handlebars are formed in a unitary fashion, and may be comprised of carbon fiber, aluminum or other suitable materials.

In some embodiments, a central bar projects forward of the stem clamp area and leaves an opening or cavity between the bar and the stem clamp area. The central bar area, which is a structural member in at least some embodiments, can be configured to support a cycling computer, and can be arcuate or any other convenient shape and cross-section that provides support for a cycling computer, mobile phone, lights, or other similar devices. In addition, in some embodiments the cavity sidewalls and/or adjacent portions of the first and second bar sections are configured to provide thumb indices such that the thumbs can rest either at the edges of the cavity or curl under the sidewalls of the cavity. The numerous hand positions provided by the present invention can in some embodiments provide one or more of improved aerodynamic cross-section, reduced fatigue and improved ergonomics.

In some embodiments, the handlebar can vary in width and have a bar diameter that is proportional to the associated width. In other embodiments, the cross-section of the first and section bar sections is substantially wing-shaped. The central bar section can also have a wing-shaped cross-section or other suitable cross-section if the associated bracket for attachment of the bar to the stem is matched to that cross-section.

In an embodiment, the handlebars of the present invention can have different sweep angles depending upon the application for the handlebar. As explained in detail hereinafter, in some embodiments intended to maximize aerodynamics and ergonomics, the sweep angle may, for example, vary between twenty and thirty degrees. In embodiments designed for a broader range of use, such as all-purpose road bikes, the sweep angle may, for example, be between ten and twenty degrees. In still other embodiments, such as for more extreme, technical environments, the sweep angle may, for example, be between four and ten degrees. Those skilled in the art, given the teachings herein, will appreciate that the exact sweep angle can be adjusted over a substantial range to accommodate the particular use for which that design is intended. As described in greater detail hereinafter, slope angle can also vary over a substantial range, again depending upon the particular application for which a given embodiment is intended.

In at least some embodiments, the sweep angle and the slope angle cooperate synergistically to position the rider's hands comfortably while at the same time positioning the elbows close to the sides of the torso, and allowing the rider's shoulders to move back. The effect of these changes is to reduce fatigue and otherwise provide the ergonomic benefits discussed above. Further, the improved position of the cyclist reduces frontal surface area and improves aerodynamics.

In some embodiments, the handlebar of the present invention can be configured for use on mountain bikes. In at least some embodiments, the central section of a mountain bike handlebar can be similar or identical in shape to the central portion, left top portion and right top portion of the drop handlebar embodiments described above. The outer section of the inventive mountain bike handlebar can still feature grips, brake levers, and shifters or controls with which mountain bike cyclists are familiar. As with the above-described embodiments the mountain bike embodiment provides hand and body positions that, during mountain bike riding, provide improved ergonomics, reduce fatigue, and decrease aerodynamic drag.

The foregoing and other benefits of the present invention can be better appreciated from the following detailed description of the invention, taken in combination with the appended Figures.

THE FIGURES

FIG. 5A shows in plan view a further alternative embodiment of the handlebar of the present invention.

FIG. 5B shows in front elevational view the handlebar of FIG. 5A.

FIGS. 11A-11C show perspective, front elevational and top plan views of an embodiment of the invention configured for use with mountain bikes wherein the central portion of the bar is analogous to the embodiment shown in FIGS. 2A-2B.

FIGS. 12A-12D show front and rear perspective, front elevational and top plan views of an embodiment of the invention configured for use with mountain bikes wherein the central portion of the bar is analogous to the embodiment shown in FIGS. 5A-5B.

The various embodiments of the present invention will be described in conjunction with the appended drawings, wherein like designations denote like elements.

DETAILED DESCRIPTION OF THE INVENTION

Figure 1B:
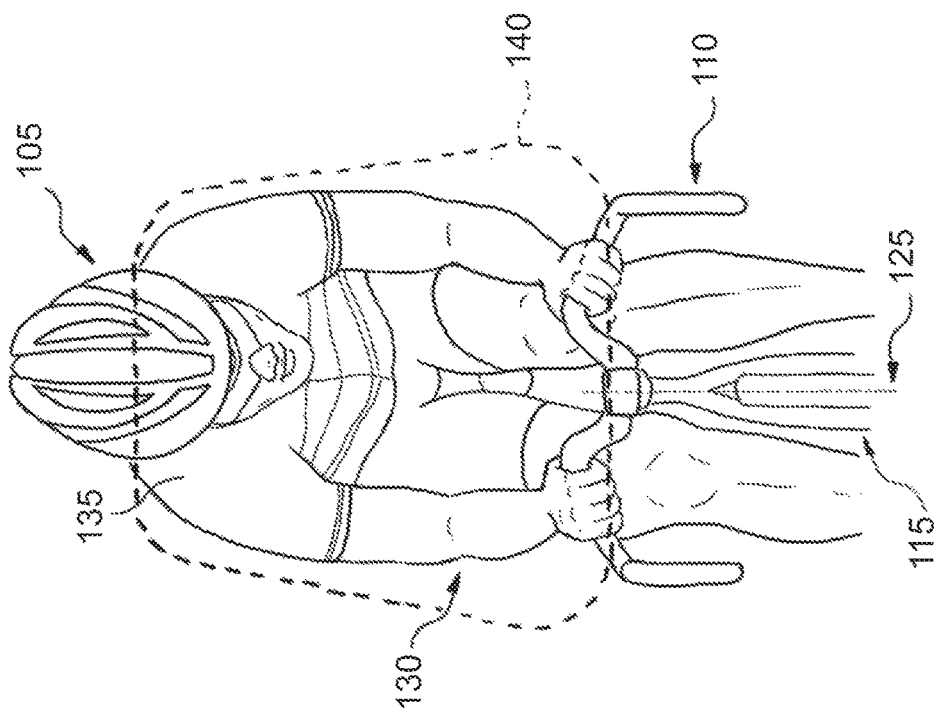
FIG. 1B is a front elevational view of a rider on the bicycle of FIG. 1A.
Figure 1A:
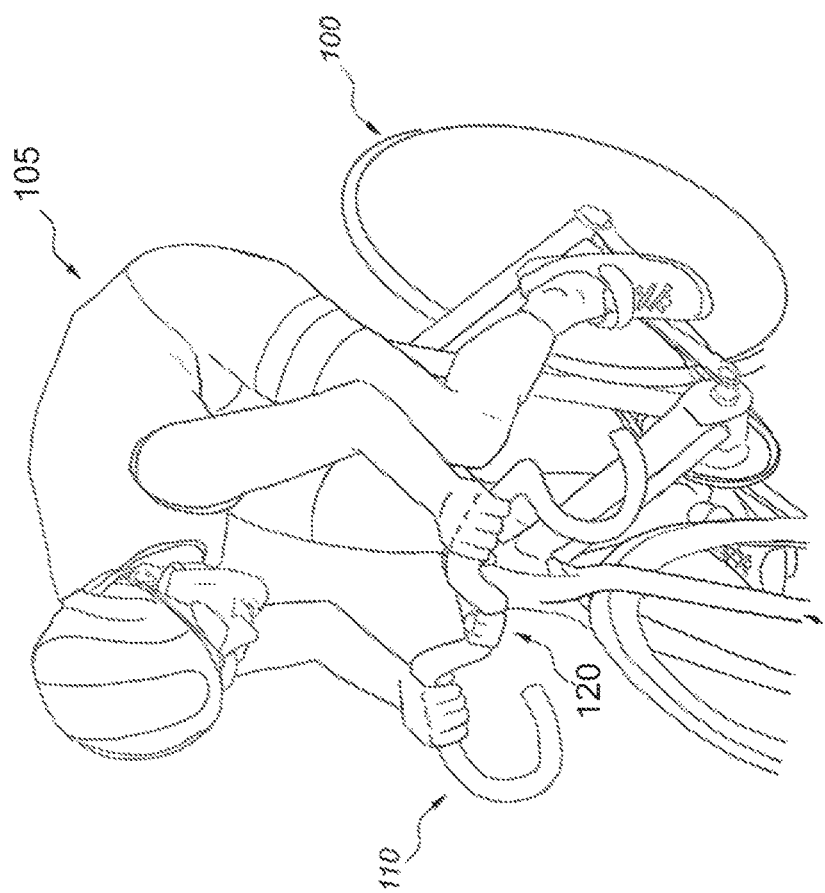
FIG. 1A shows a perspective view of a rider on a bicycle having handlebars according to an embodiment of the invention.

Referring first to FIG. 1A, a bicycle 100 is shown being ridden by a rider 105. The rider's hands grip a handlebar 110 configured in accordance with an embodiment of the invention, and sometimes referred to as a "drop" handlebar as opposed to the mountain bike embodiment discussed below. The handlebar 110 is affixed to a front fork 115 by means of a stem 120. While in many embodiments the stem is separate from the handlebar, in some embodiments the handlebar and stem are formed together as a unitary handlebar system. In the position shown, the bicycle is deemed to be in the "normal" orientation in that the direction of the front wheel is substantially aligned with the direction of the rear wheel, the bicycle is substantially vertical, and both wheels are touching the ground. In at least some embodiments, the handlebar 110 is symmetrical along the sagittal plane 125. It will be appreciated by those skilled in the art that brake levers are omitted for simplicity and clarity. Most embodiments for road bikes will include brake levers, although embodiments for track bikes typically do not include brake levers. The present invention is suitable for both applications, depending upon the embodiment.

As shown in FIG. 1B, the position of the rider's hands on the handlebar 110 naturally positions the rider's elbows 130 substantially adjacent the rider's torso, and further positions the riders shoulders 135 somewhat backward into a more neutral and comfortable position. The combination results in a rider position that improves comfort and efficiency while achieving a reduced frontal area 140.

Figure 2A:
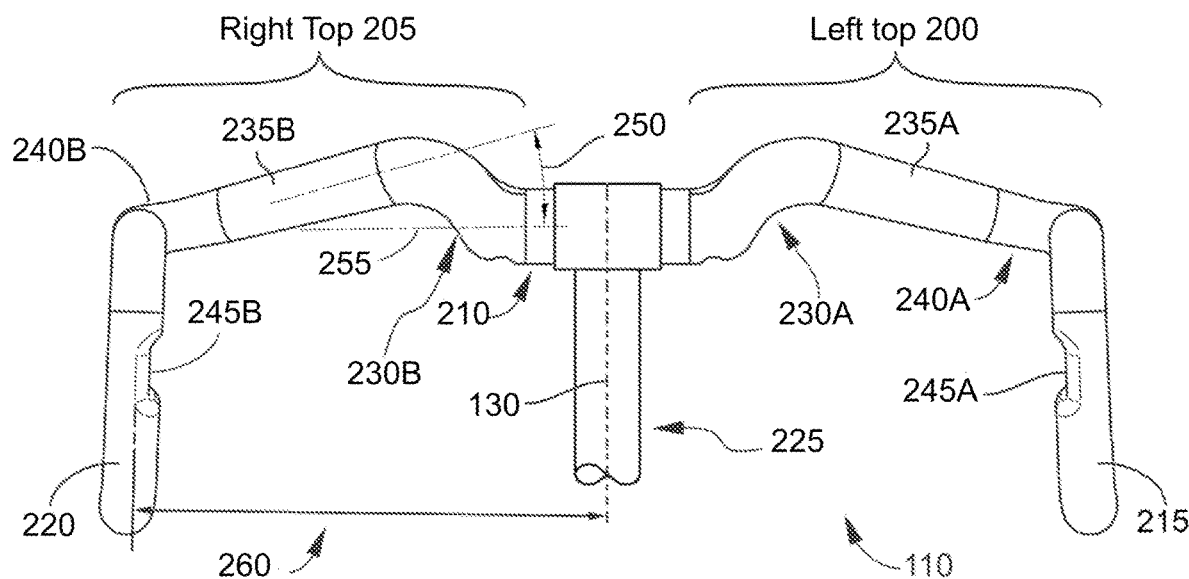
FIG. 2A shows in elevational view a handlebar according to an embodiment of the invention.
Figure 2B:
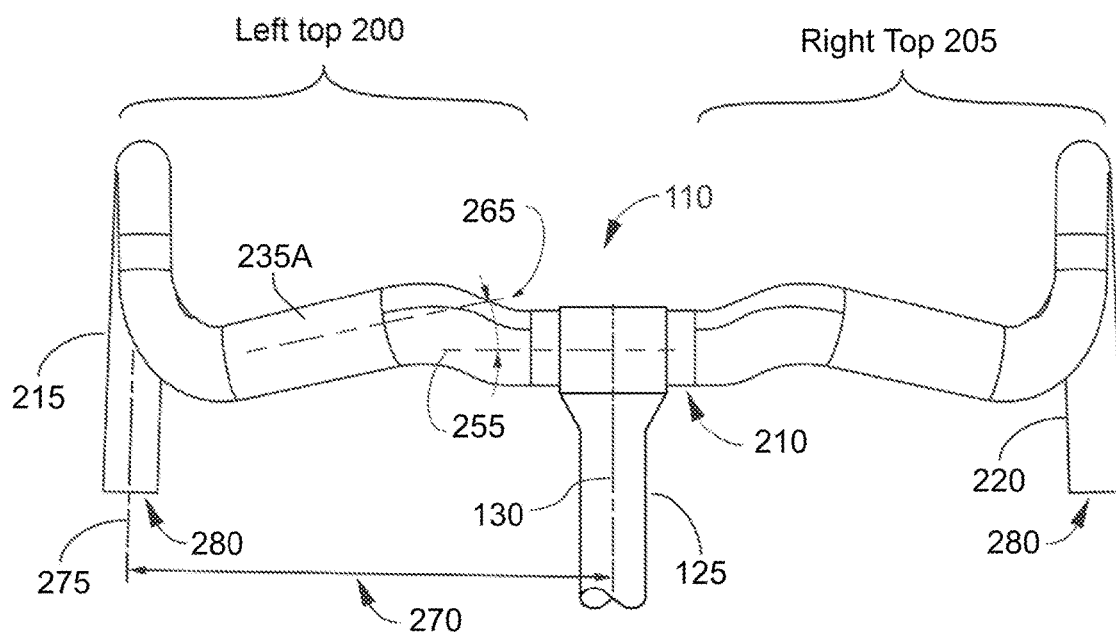
FIG. 2B shows in plan view the embodiment of the present invention shown in FIG. 2A.

Referring next to FIGS. 2A-2B, handlebar 110 according to an embodiment of the invention is shown in front view (FIG. 2A) and plan view (FIG. 2B). Handlebar 110 comprises left top portion 200 and right top portion 205, central stem clamp portion 210, left drop 215 and right drop 220. Steerer tube or riser 225 is rigidly connected to or formed integrally with front fork 115 (FIG. 1A) and allows the stem 120 (FIG. 1A) onto which the handlebar 110 is mounted to be fixedly attached to the front fork, thus allowing the bicycle to be steered. It will be appreciated that the stem clamp portion 210 is, in at least some embodiments, designed to sit substantially horizontally and substantially perpendicularly to the sagittal plane 125 of the bicycle at normal orientation. The stem clamp portion is of any suitable diameter, for example 31.80 mm.

The left and right top portions 200 and 205 each comprise an inner portion 230A-B, a central grip portion 235A-B, and an outer or shoulder portion 240A-B. The portions 230A-B, 235A-B and 240A-B are typically symmetrical. The shoulder portions 240A-B form a transition to the drops 215 and 220. Although described herein as separate portions for purposes of clarity, in at least some embodiments the entire handlebar 110 is formed as a unitary, integrated design. In at least some embodiments the handlebar 110 is constructed of carbon fiber-based materials, for example Toray T700 or a mixture of T700 and T800. Other embodiments can be made from aluminum, stainless, plastics, or other materials having the desired characteristics of strength, rigidity and acceptable weight. It will be appreciated that, in some embodiments, the cross-section of at least the central grip portions 235A-235B may be ovoid in cross-section. As just one example, for a handlebar 110 having a width of forty centimeters, the cross-sectional major axis may be 33.5 mm and the minor axis 24 mm, although the specific dimensions can vary extensively with the width of the bar in keeping with the guidelines discussed herein.

In some embodiments, thumb indexes or indentations, indicated at 245A and 245B, can be provided on the inner side of drops 215 and 220. The operation of such notches is described hereinafter, especially in connection with FIGS. 3A-3B, and is further described in detail in U.S. patent application Ser. No. 16/548,703 filed Aug. 22, 2019, and originally entitled Coefficient Ergonomic Handlebar Systems, incorporated herein by reference.

As shown in FIG. 2A's front elevational view, the grip portions 235A-B of left and right tops 200 and 205 define a slope angle 250 relative to a clamp axis 255 which is the longitudinal axis of the stem clamp portion 210 that is substantially perpendicular to the sagittal plane 125 of the bicycle when normally oriented. Depending upon the embodiment, the slope angle can range between five and 45 degrees. More specifically, for some applications, an embodiment with a large slope angle, for example between twenty-five and forty-five degrees, creates a very narrow grip that places the hands closer together. In turn, this prioritizes aerodynamics and ergonomics over other considerations. For other applications, for example an embodiment designed for a standard road bike suited for all-around use, the slope angle may be smaller, for example between ten and twenty-five degrees. As one example, a forty centimeter wide handlebar suited for all-around use may have a slope angle of twelve degrees, while other widths of such a design may have slope angles between eight and fifteen degrees. In other applications, for example extreme, technical off-road environments where maintaining control may be more difficult, a more widely spaced grip and more outward pointing elbows may be preferred and in such cases an embodiment having a slope angle between five and ten degrees may be preferred. Given the teachings herein, it will also be appreciated by those skilled in the art that, in some embodiments, the slope angle can vary along the grip portion.

Also as shown in FIG. 2A's front elevational view of handlebar 110, the drops 215 and 220 define a drop angle 260 relative to the sagittal plane 125. In most embodiments, the drop angle will be between zero and ten degrees, although in some embodiments the flare angle can be as high as 45 degrees.

In the plan view of FIG. 2B, a sweep angle 265 can be seen between the sagittal plane 125 and the grip portions 235A-B. In most embodiments the sweep angle ranges from four to thirty degrees, with smaller ranges typically associated with particular applications. Thus, as discussed above for slope angle, a sweep angle of twenty to thirty degrees—resulting in a very narrow grip—may be implemented in an embodiment intended for applications where aerodynamics and ergonomics are prioritized over other considerations. An embodiment designed for all-around road bike use may implement a sweep angle in the range of ten to twenty degrees. An embodiment intended for technical off-road riding in more extreme environments may implement a sweep angle in the range of four to ten degrees to enable a widely spaced grip and potentially better control. As just one example, in an embodiment designed for all-around use, and a 40 cm width, a sweep angle of twelve degrees can be implemented, although other widths of such an all around bar may have a sweep angle ranging between eight and fifteen degrees.

FIG. 2B also illustrates a flare angle 270 defined by an axis 275 substantially perpendicular to the opening of end 280 of the drops of handlebar 110 and the sagittal plane 125 of the bicycle when the bike is normally oriented. Depending upon the embodiment, the flare angle can range from 0-25 degrees, and in many embodiments is between zero and ten degrees.

It will be appreciated by those skilled in the art, given the discussion herein, that the precise angles and ranges of angles described herein for slope, sweep, drop and flare are not limiting, and are provided simply as an aid in the understanding and practicing of the invention where the benefits provided by the present invention extend across a wide range of applications.

In some embodiments, the diameter of the handlebar is proportional to the width of the handlebar. Bicycle handlebars are traditionally sized based on the width of the cyclist's shoulders. Smaller cyclists will generally have narrower shoulders. Smaller cyclists will generally also have smaller hands. Since bars that better match cyclist hand size are more comfortable and, hence, less fatiguing, in at least some embodiments of the present invention larger bars have larger diameters and smaller bars have smaller diameters in various embodiments.

In some embodiments, slope angle 250 and sweep angle 265 are selected independently during the design process to provide improved cyclist positioning. In other embodiments, sweep angle 265 and slope angle 250 of handlebar 110 are selected to work together synergistically to create improved rider ergonomics and positioning to an extent not accessible without optimizing sweep angle 265 and slope angle 255 together. Such positioning can include placement of the cyclist's center of gravity with respect to the bike. It will be appreciated that, in some implementations of the handlebar 110, brake levers and hoods are affixed to the front of the drops 215 and 220.

Figure 3A:
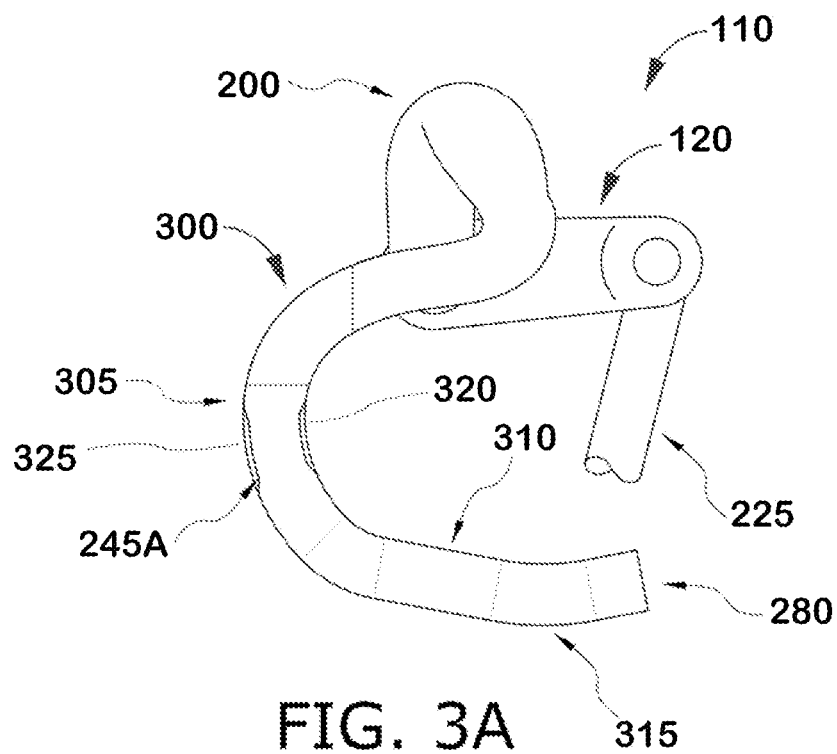
FIG. 3A shows in left side elevational view the handlebar of FIG. 2B, with the addition of a faceplate and stem.
Figure 3B:
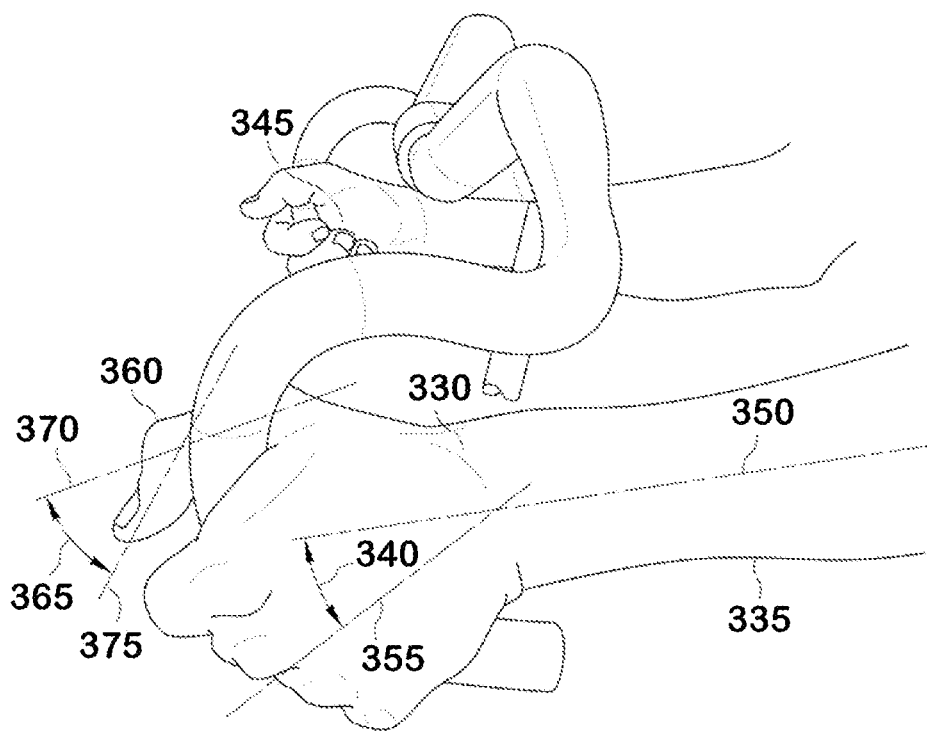
FIG. 3B is a perspective view illustrating the positioning of a rider's hands on the drops such that the thumbs engage notches on the inside of the drop.

Referring next to FIGS. 3A and 3B, the benefits of the thumb index or indentations 245A-245B shown in FIG. 2B can be better appreciated. FIG. 3A shows in left elevational view an embodiment of the handlebar 110 wherein the drop 215 of FIG. 2B includes an upper curved section 300 that connects to left top 200, a substantially vertical handlebar segment 305, a substantially flat palm steering segment 310, and a lower segment 315 ending at end 280. In an alternative embodiment, the drop can have a continuously varying curve while still providing some or all of the foregoing features in substantially the same relative positions. Placement of the palms in the substantially flat palm-steering segment 310 naturally allows the thumb to engage the index 245A. In some embodiments, the indexes 245A-245B can have a shorter dimension 320 at back edge, closest to the palm steering segment 310, and a longer dimension 325 at the front of the segment 305, to match the shape of the thumb as it extends forward of the palm, as shown in FIG. 3B. In other embodiments, the indexes 245A-245B can be the same length front and back. In an embodiment, and as just one example, the palm steering segment 310 can be 65 mm in length, although other lengths are also acceptable.

With particular reference to FIG. 3B, it can be seen that palm-steering segment 310 places the cyclist's wrist 330 in position in relation to forearm 335 such that palm angle 340 rotates palm 345 a few degrees, for example 10 degrees, toward the bike's center of gravity between forearm angle line 350 and wrist angle line 355. Different embodiments can yield different palm rotation angles. With reference again to FIG. 1B in combination with FIG. 3B, it can be seen that thumb index 245A and flat palm-steering segment 300 work together to achieve the desired center of gravity for the cyclist with respect to the bike 100. Thumb index 245A of handlebar 110 causes thumb 360 to be positioned at a thumb index angle 365 of first thumb index line 370 and second thumb index line 375, thus providing a reference for thumb 360 for properly gripping handlebar 110. This results in moving elbows 130 inward a few degrees, for example in the range of three to five degrees, which in turn results in reducing frontal area and may, in some circumstances and for some riders, lessen risk of injury to the rider.

Figure 4A:
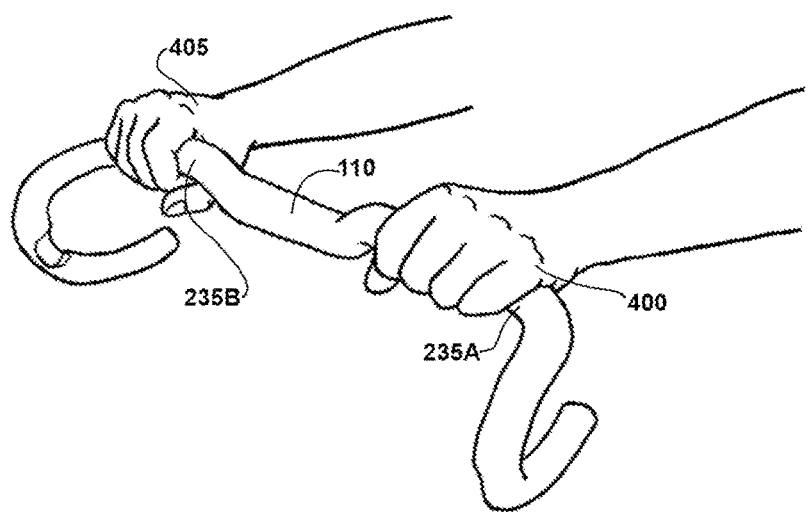
FIGS. 4A-4B illustrate examples of hand positions a rider may choose when placing the hands on the sloped and swept portion of the handlebar of FIG. 2B.
Figure 4B:
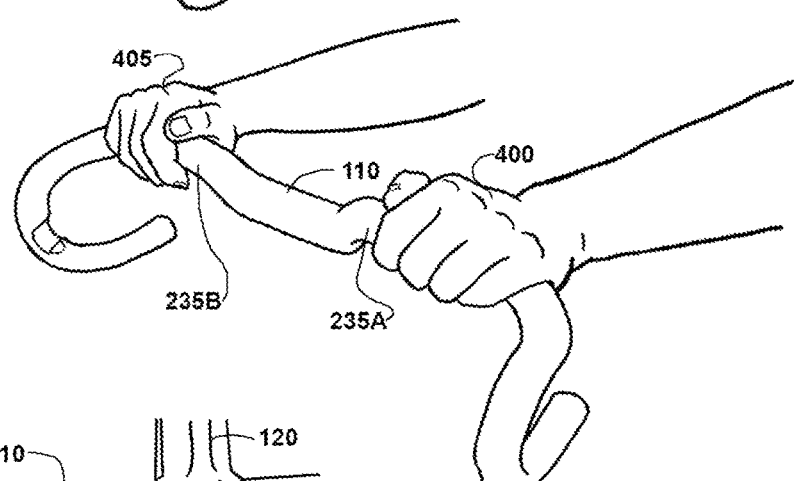

Referring next to FIGS. 4A-4B, shown therein are examples of various hand positions a rider may choose when placing the hands on the sloped portion of the handlebar of FIG. 2B. Importantly, the combination of one of more of slope angle, sweep angle, drop angle and flare angle as discussed above results in improved cyclist ergonomics and greater cyclist comfort and performance when placing the hands in any of the positions illustrated. Thus, as shown in FIG. 4A, left hand 400 and right hand 405 are positioned in an overhand grip on sloped and swept grip portions 235A-235B of handlebar 110, with the thumbs curled underneath the bar. In FIG. 4B, the hands 400 and 405 are also on the sloped and swept grip portions 235A-235B of handlebar 110, but the thumbs rest on the top of the bar. In at least some embodiments, the combination of the various angles of the handlebar of the present invention reduces stress on the wrists, brings the elbows in toward the torso and brings the shoulders back, thus resulting in better control, greater comfort, and reduced frontal area when the hands are in any of the positions illustrated in FIGS. 4A-4B.

Figure 4C:
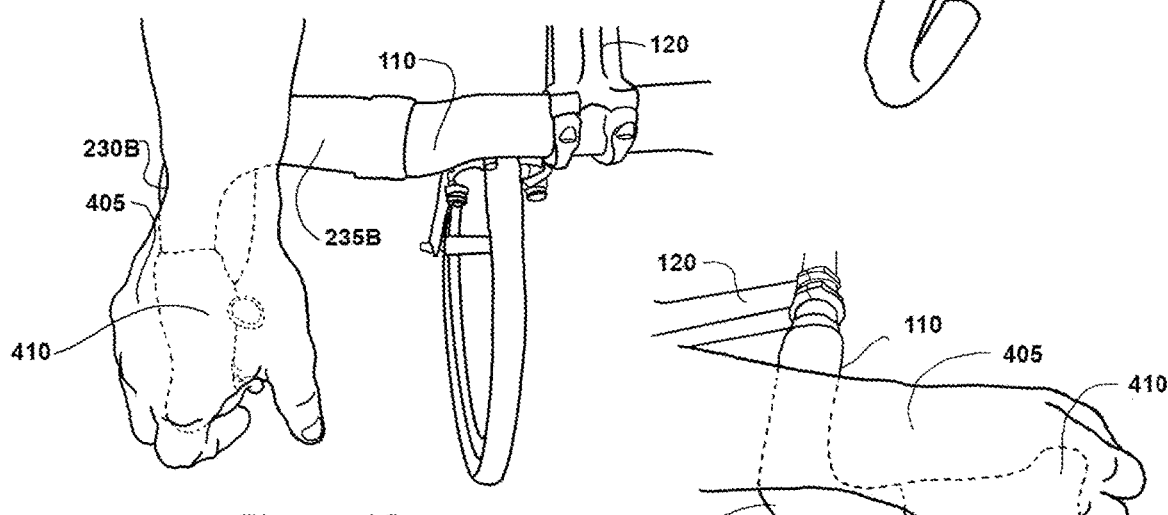
FIGS. 4C-4D illustrate placing the right hand on the brake hood of the handlebar of FIG. 2B, where the shoulder portion of the right top bar section provides comfortable support for the wrist and/or forearm.
Figure 4D:
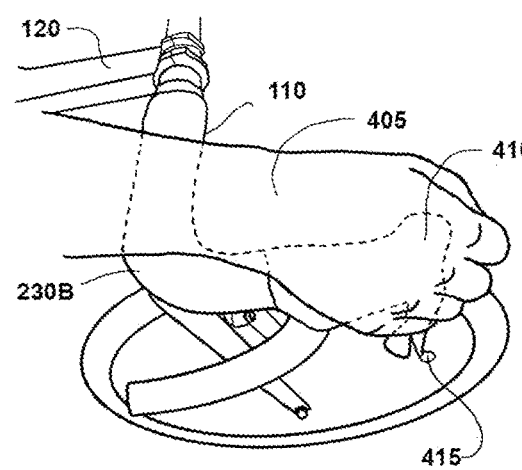

Referring next to FIGS. 4C and 4D, a somewhat different hand position is shown. In particular, the palm of the right hand 405 is positioned atop the brake hood 410, and either the wrist or the forearm, depending on the particular cyclist, is supported on the right shoulder section 240B of the handlebar 110. The slope and sweep of the grip portion 235B and shoulder 240B provide a natural rest for the cyclist's wrist and forearm. In this position, sometimes referred to as a "hammock" position, the improved ergonomics of the present invention enable the cyclist to assume an aerodynamically favorable position with improved control of the bicycle while also relaxing the forearms, wrists and hands. In some embodiments, such improved control and comfort can be further enhanced by increasing the width, flatness or both of the top surface of the upper portion of the drops or otherwise changing the shape of the portion of the bar near the brake hood to create a larger contact or other supportive surface between the wrist or forearms and that section of the bar 110. In some embodiments flare angle can also be increased to accommodate the additional width or flatness, and the curvature of the shoulder portion can be modified to ensure that the upper portion of the drops does not impede the cyclist when gripping the lower portion of the drops.

Figure 5C:
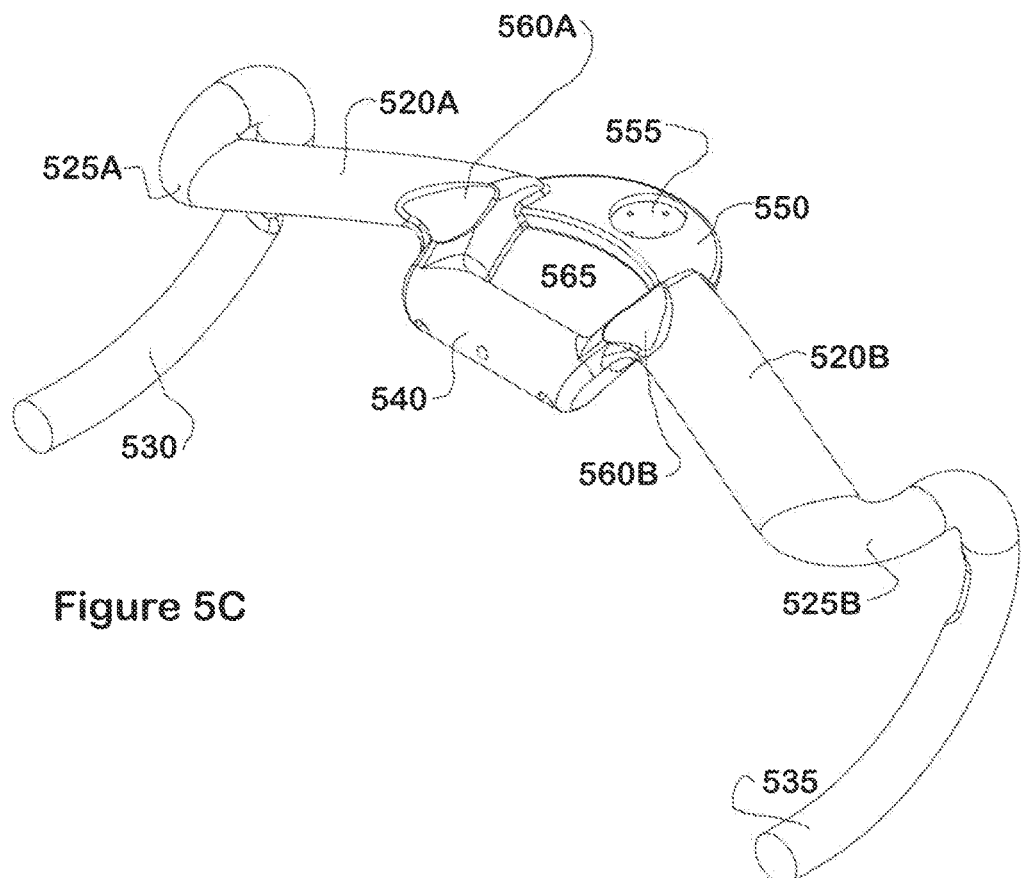
FIG. 5C shows in rear three-quarter perspective view the handlebar of FIG. 5A.
Figure 5D:
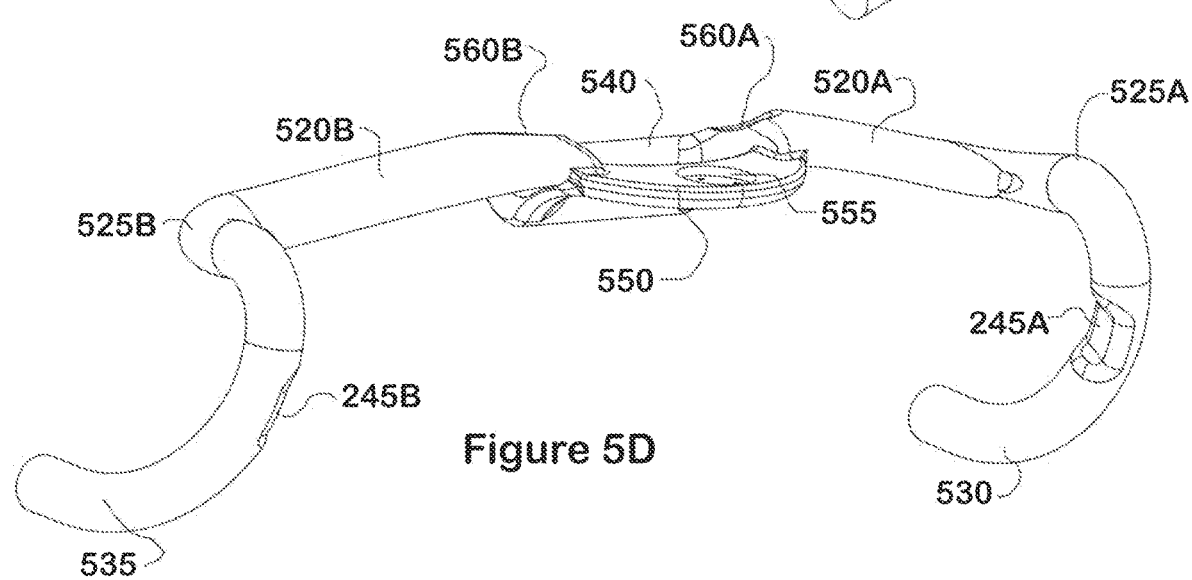
FIG. 5D shows in front three-quarter perspective view the handlebar of FIG. 5A.

Referring next to FIGS. 5A-5D, an alternative embodiment of the handlebar 110 is shown. More specifically, FIGS. 5A-5B show an embodiment of a handlebar 500 in top plan view and front elevational view where left top portion 505 and right top portion 510 each comprise an inner portion 515A-515B, a central grip portion 520A-B, and a shoulder or outer transition portion 525A-B, respectively. In addition, the handlebar 500 comprises left and right drops 530 and 535, respectively. A stem clamp portion 540 is positioned between the left top portion and the right top portion, and is substantially bisected by the sagittal plane 545 of the handlebar 500. A frontal bar 550 spans the gap between the front of the inner portions 515A-515B. The front bar 550 is arcuate in some embodiments, and provides a mount 555 for a cycling computer, smartphone, lights or other device. In at least some embodiments, the front bar 550 provides structural support. In some embodiments, top thumb indexes 560A-B for resting the thumbs can be provided on the inner portions of the left and right tops. Further, in some embodiments the cavity 565 formed between the stem clamp portion 540 and the frontal bar 550 provides space for the thumb indentations to be extended down the inner walls of the cavity 565 such that the thumbs can grip the inner sidewalls 570 of the cavity 565 to provide a more secure grip—and thus safer steering—while at the same time allowing the palms and arms to relax somewhat and to save the rider's energy. As with the embodiment shown in FIGS. 2A-2B, thumb indexes 245A-245B are placed in interior side of drops 530 and 535.

As with the embodiment of FIGS. 2A-2B, the central grip portions 520A-520B each define a sweep angle 575 relative to a plane orthogonal to the sagittal plane 545, as shown in FIG. 5A. Also shown in FIG. 5A is flare angle 580. FIG. 5B shows slope angle 585 as well as drop angle 590. The ranges for these angles are within the ranges set forth above for the embodiment of FIGS. 2A-2B, although in an exemplary embodiment the sweep angle can be nominally fifteen degrees, the slope angle nominally twelve degrees, the drop angle nominally five degrees, and the flare angle 1.9 degrees. However, unlike the embodiment of FIGS. 2A-2B, the central grip portion of the left and right tops of the embodiment of FIGS. 5A-5B have a substantially wing-shaped cross-section, although the stem clamp portion 540 can in at least some embodiments be round with a conventional diameter of, for example 31.80 mm. In an exemplary embodiment, for example for a bar having a width of forty centimeters, the width of the grip portion may be forty-seven millimeters with a thickness of approximately one-third of the width where compliance with UCI regulations is desired.

Figure 5E:
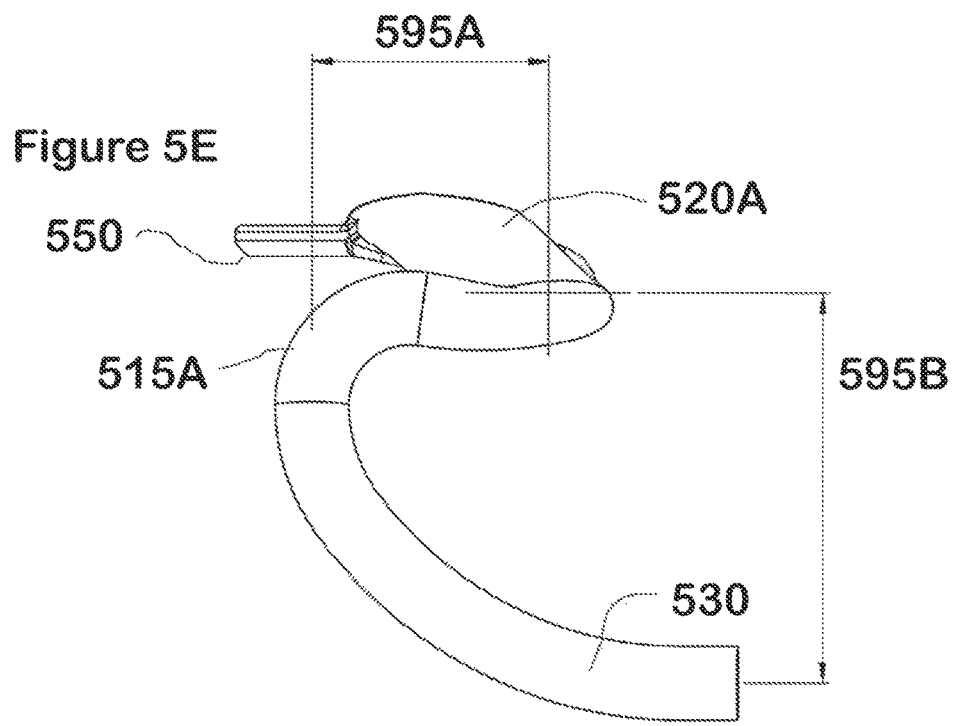
FIG. 5E shows in left side elevational view the handlebar of FIG. 5A.

Referring particularly to FIG. 5E, a handlebar according to the embodiment of FIGS. 5A-5D can be seen in left elevational view. The frontal bar 550 can be seen to extend forward of the transition portion 525A and drop 530. The extent to which the frontal bar 550 can extend forward is, for some embodiments seeking compliance with UCI rules, limited to five centimeters ahead of the front axle, although other embodiments have no such limitation. It will be appreciated that the embodiment of the drop 230 shown in FIG. 5E is substantially arcuate, and need not have the relatively flat portion shown for the handlebar of FIGS. 2A-2B. It will be appreciated by those skilled in the art that the key consideration is to have a comfortable resting place for the palms while the thumb engages the associated thumb index. As just one example, the reach 595A of an embodiment can be approximately 77 mm while the drop 595B can be approximately 120 mm. It will also be appreciated that the top bars 505 and 510 need not be wing shaped in all embodiments, but instead can have cross-sections that are round, ovoid, or other desired shape.

Figure 6:
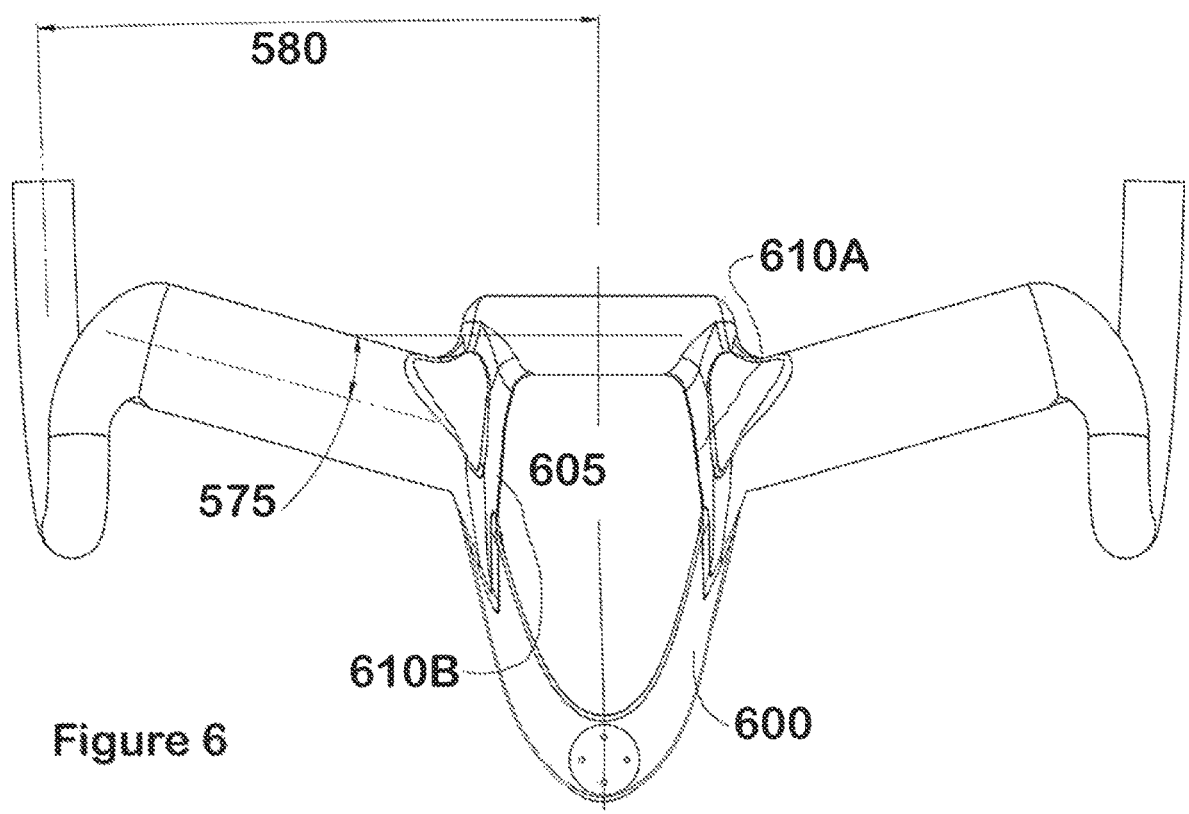
FIG. 6 shows in top plan view a further alternative embodiment of a handlebar in accordance with the invention.

Referring next to FIG. 6, a further alternative embodiment, substantially identical to that of FIGS. 5A-5E except having a more dramatic variation of a frontal bar. Reference numerals identical to those of FIGS. 5A-5B are omitted for clarity. Thus, frontal bar 600 extends forward significantly farther than frontal bar 550 of FIG. 5A, for example as far forward as the brake hoods, the front axle, or to or beyond the limit imposed by UCI rules. This creates a larger cavity 605, which in turn allows the cyclist's hands to rest comfortably on the tops while the thumbs extend downward against the sidewalls 610A-610B. The additional space also allows for a variety of placements of a cycling computer or other electronics or similar devices.

Figure 7A:
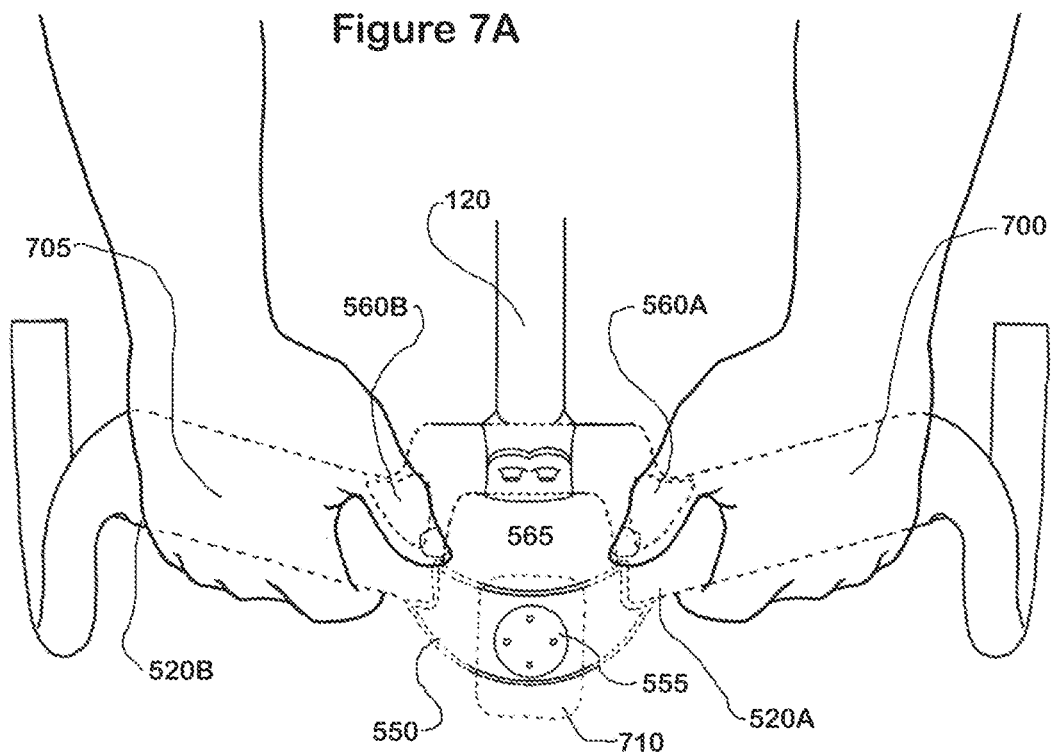
FIGS. 7A-7B illustrate examples of hand positions a rider may choose when placing the hands on the sloped portion of the handlebar of FIGS. 5A-5B.
Figure 7B:
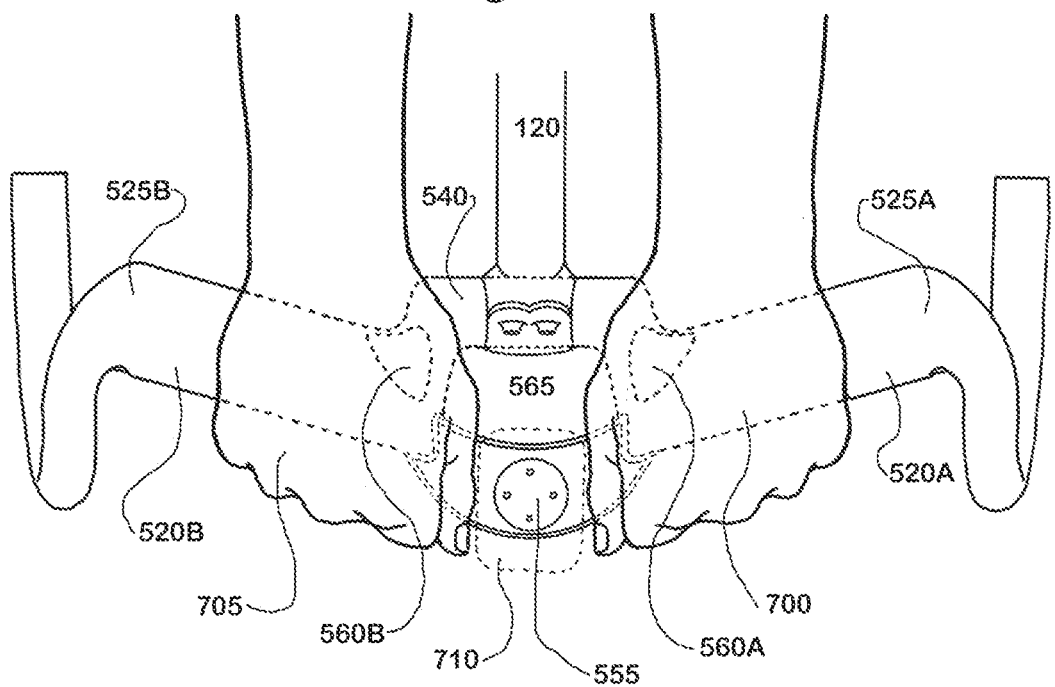

Illustrated in FIGS. 7A and 7B, are two hand positions possible with the handlebar of FIGS. 5A-5B. In particular, illustrated in FIG. 7A is a hand position wherein the cyclist's hands 700 and 705 grip the center top portion 520A-520B, which allows the cyclist's thumbs to naturally settle into indentations or indices 560A-560B positioned at the inner portions 515A-515B of the handlebar. The thumbs may in some instances extend past the indices 560A-560B onto the center bar portion 550, while still allowing a cycling computer, smartphone or other electronic device 710, designated by a dashed line, to be mounted to the central mount 555.

Illustrated in FIG. 7B is a slightly different hand position, where the hands are positioned partly on the center top portion 520A-520B and partly on the inner portion 515A-515B of left top portion 505 and right top portion 510 (FIGS. 5A-5B) such that the cyclist's palms rest atop the indices 560A-560B rather than near the shoulders 525A-525B. In such a position, the cyclist's thumbs can rest on the central bar portion 550 and may extend beyond the forward edge of the bar 550. In some embodiments, the cycling computer or other electronic device 710 can, if required to provide space for the cyclist's hands, be mounted on a riser attached to mount 555 so that there is space underneath the device 710. Alternatively, the design of FIG. 6 may offer the desired additional space.

Figure 8:
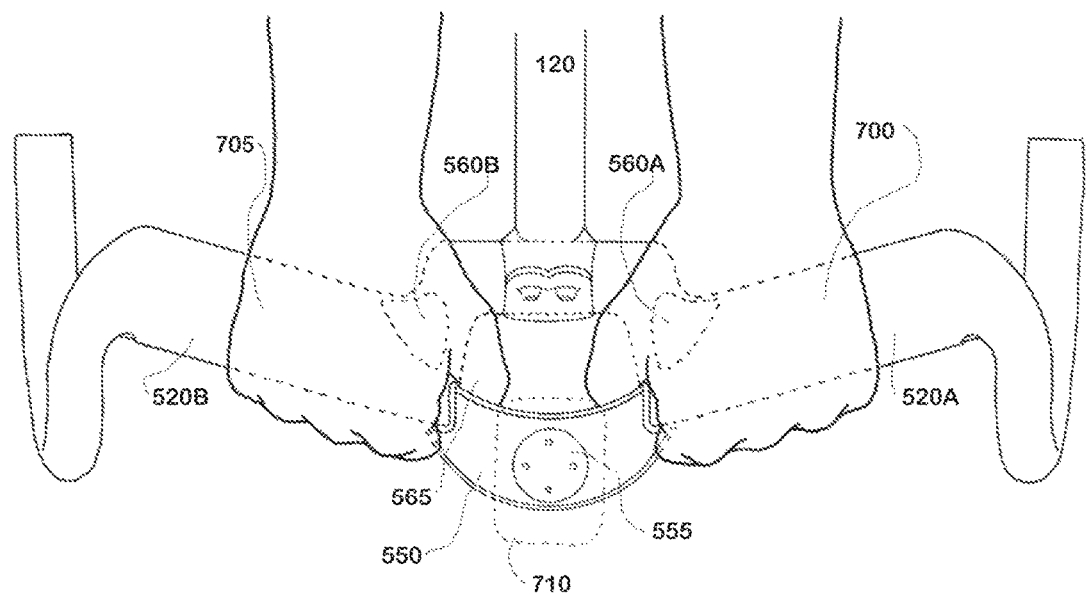
FIG. 8 illustrates an example of a hand position a rider may choose when placing the thumbs along the inside wall of the cavity formed in the handlebar of FIG. 5A-5B.

Referring next to the hand position shown in FIG. 8, a cyclist's thumbs can be seen to extend down into cavity 565 and grasp sidewalls 570 (FIG. 5A) while the palms rest partly on inner portions 515A-515B and partly on center portions 520A-520B. In such a position, the palms typically cover the indices 560A-560B but the central bar is left open for the mounting of electronic device 710 on mount 555.

Figure 9A:
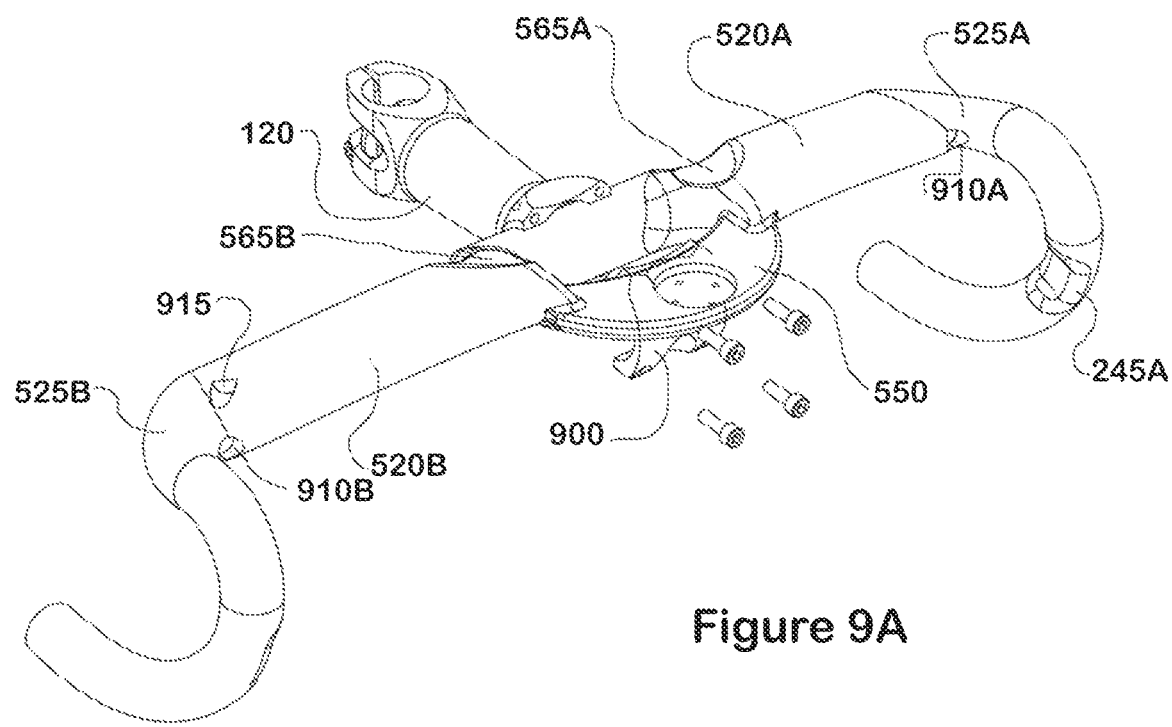
FIG. 9A shows in perspective view the handlebar of FIGS. 5A-5B including the faceplate and stem.
Figure 9B:
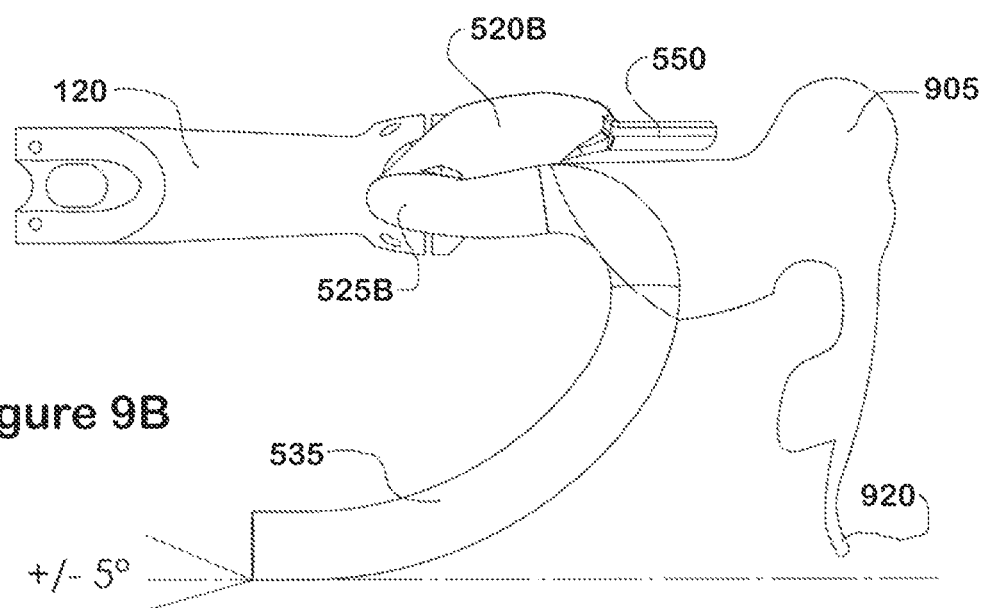
FIG. 9B illustrates in side elevational view the handlebar of FIGS. 5A-5B including brake levers and hoods and mounting bracket.

Referring next to FIGS. 9A-9B, further details relating to an embodiment similar to FIGS. 5A-5B can be appreciated. In particular, the stem 120 can be seen mounted to the central stem clamp portion and faceplate 900 can be seen mounted to the stem. As with the embodiment of FIGS. 2A-2B, the stem and handlebar can be formed either as separate pieces or can be formed integrally as a unitary structure. The illustration of handlebar of the present invention as a separate piece from the remainder of the bike is not intended to be limiting but instead is intended to illustrate simply and clearly various aspects of the invention. In the illustrated embodiment the faceplate is mounted to the remainder of the stem with four bolts, but other styles and designs are acceptable as long as the handlebar is fixedly mounted to the steering tube. In addition, cable holes 910A-910B and 915 are illustrated in FIG. 9A, and are discussed in greater detail in connection with FIG. 10.

With reference to FIG. 9B, a right side elevation view of the handlebar with brakes and brake hood can be better understood. The brake hood 905 mounts over a brake lever 920 which is mounted on drop 535 in a position intended, in at least some embodiments, to facilitate the hand position of FIG. 4C but with the wider top of the bar as shown in FIGS. 5A-5B.

Figure 10:
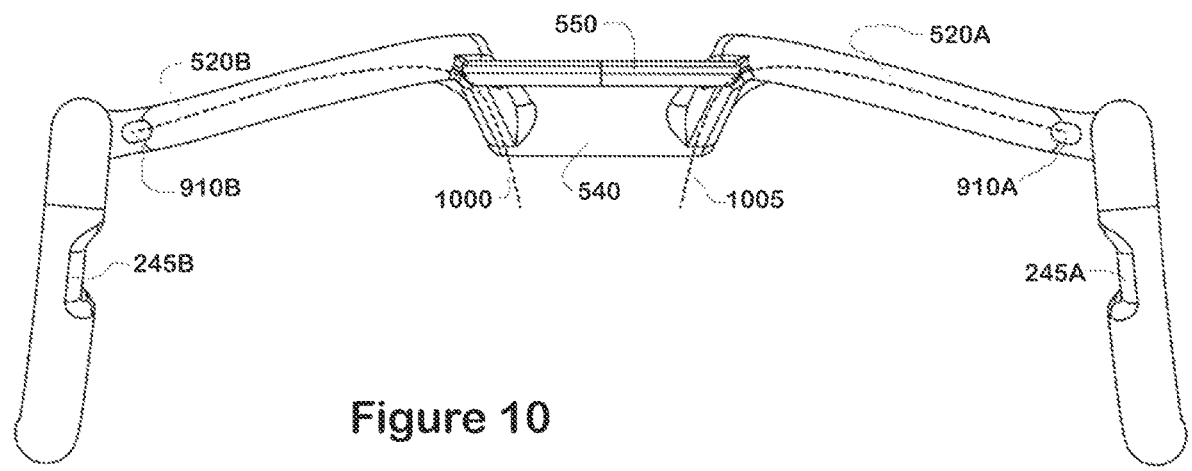
FIG. 10 shows a front elevational view of the handlebar of FIGS. 5A-5B with an example of cable routing.

Referring next to FIG. 10, an embodiment having cables 1000 and 1005 routed through the bar can be better appreciated. As can be seen, cables 1000 and 1005 are mounted in any convenient location along the central portion 520A-520B of the handlebar 110. The cables then pass through holes 910A-910B and connect to either the brakes or derailleur.

From the foregoing, it will be appreciated that, in at least some embodiments, one or more of slope angle 250, drop angle 260, sweep angle 265 and flare angle 270 (FIGS. 2A-2B) or similar angles in the other embodiments discussed above, can be combined to position a cyclist's hand placement in a number of positions that allow the cyclist's hands, elbows and shoulders to more naturally and comfortably narrow such that the rider's frontal area 140 is reduced, thus also reducing wind resistance. Further, at least some combinations of the foregoing angles provide hand positions that offer improved ergonomics for the hands, elbows, arms and shoulders, and thus improve cyclist efficiency and preserve the cyclist's energy.

Some embodiments of the handlebar 110 yield an optimal position of a cyclist's grip for improved pedaling efficiency by limiting the amount of energy lost to side-to-side movement outside of a more nominal center of gravity. In some embodiments the handlebar 110 is comprised of carbon fiber materials. Other materials may be used in alternate embodiments.

Certain embodiments of the handlebar 110 may be arranged such that the functional combination of sweep angle 265 and drop angle 260 create an optimal camera angle for viewing traffic behind user 105. These embodiments of handlebar system 100 may be arranged such that the functional combination of slope angle 250 and drop angle 260 create an optimal camera angle for viewing road beneath and behind cyclist 105.

Figure 11A:
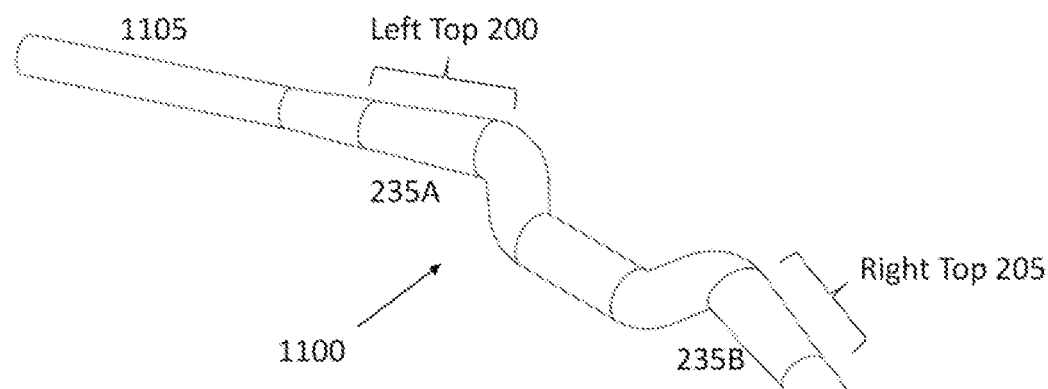

Referring next to FIGS. 11A-11C, an embodiment of the present invention particularly suited to mountain bikes and the like are shown. In particular, FIG. 11A shows such an embodiment from a top perspective view, FIG. 11B shows a front elevational view, and FIG. 11C shows top plan view. A comparison of FIGS. 11A-11C with FIGS. 2A-2B shows that the center portion of the mountain bike bar 1100 is configured in a manner analogous to the road bike bar shown in FIGS. 2A-2B but with left and right outer grip portions having backsweep and upsweep angles characteristic of mountain biking. Thus, using like reference numerals for like elements in the analogous bar of FIGS. 2A-2D, handlebar 1100 comprises left top portion 200 and right top portion 205, central stem clamp portion 210, left outer grip portion 1105 and right outer grip portion 1110. Steerer tube or riser 225 is rigidly connected to or formed integrally with front fork 115 as shown in FIG. 1A and allows the stem 120 onto which the handlebar 1100 is mounted to be fixedly attached to the front fork, thus allowing the bicycle to be steered. As with the road bike handlebar of FIGS. 2A-2D, the stem clamp portion 210 is, in at least some embodiments, designed to sit substantially horizontally and substantially perpendicularly to the sagittal plane of the bicycle at normal orientation.

The stem clamp portion of the mountain bike handlebar 1100 is of any suitable diameter, for example 31.80 mm. As will be appreciated by one knowledgeable it the art, the stem and handlebar may be integrated into a single element, if desired.

The left and right top portions 200 and 205 each comprise an inner portion 230A-B, a central grip portion 235A-B, and an outer or shoulder portion 240A-B. In at least some embodiments the portions 230A-B, 235A-B and 240A-B are typically symmetrical.

Mountain bike riders prefer a variety of combinations for handlebar upsweep and backsweep for the handlebar grips, and rise for the entire handlebar. At least some mountain bike embodiments of the present invention comprise a variety of upsweep, backsweep and rise options while comprising a central section having sweep and slope to provide additional ergonomic and aerodynamic benefits.

Right and left outer grip portions 1105 and 1110 extend outward from the left and right top portions 200 and 205 along a substantially straight line and configured to support brake levers, and shifters or other controls. In at least some mountain bike embodiments the grips may have an upsweep and a backsweep. In an embodiment, the upsweep angle can range from 0 degrees to positive 10 degrees although in more extreme cases the upsweep angle can range from negative 15 degrees to positive 25 degrees. Similarly, in an embodiment the backsweep angle can range from 0 degrees to positive 20 degrees while in more extreme cases the backsweep angle can range from 0 degrees to positive 45 degrees. Typical of mountain bike handlebars, in at least some embodiments of FIGS. 11A-11C the bar 1100 is wider than that of a typical drop bar, with mountain bike handlebars ranging from approximately 60 cm in width to 85 cm in width depending upon application and rider preference. Furthermore, some mountain bike riders will benefit from a more upright body position on the bike. In these instances the mountain bike handlebar may rise above the stem clamp portion 210, while maintaining some or all of the inventive features described herein. Typical of mountain bike handlebars, the rise can range from 0 mm to positive 60 mm, measured at the end of the bar, while in more extreme cases the rise can range from a negative 40 mm to positive 125 mm. In addition, in some embodiments, the ends of the grip portions 1105-1110 can be configured for attachment of grip extensions.

Figure 12A:
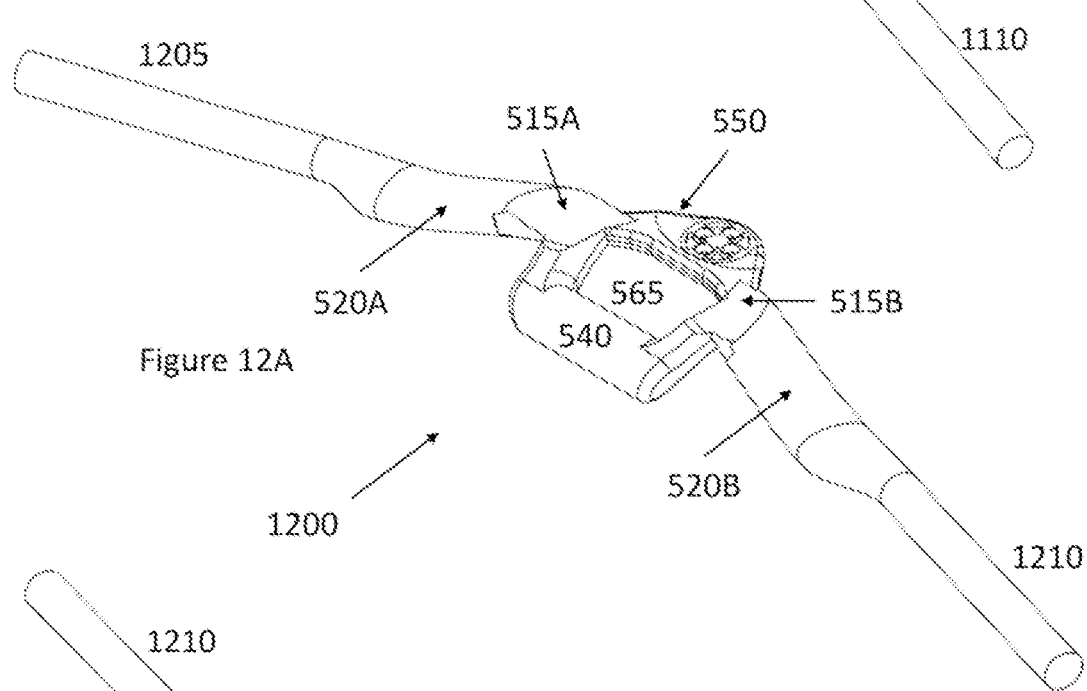
Figure 12B:
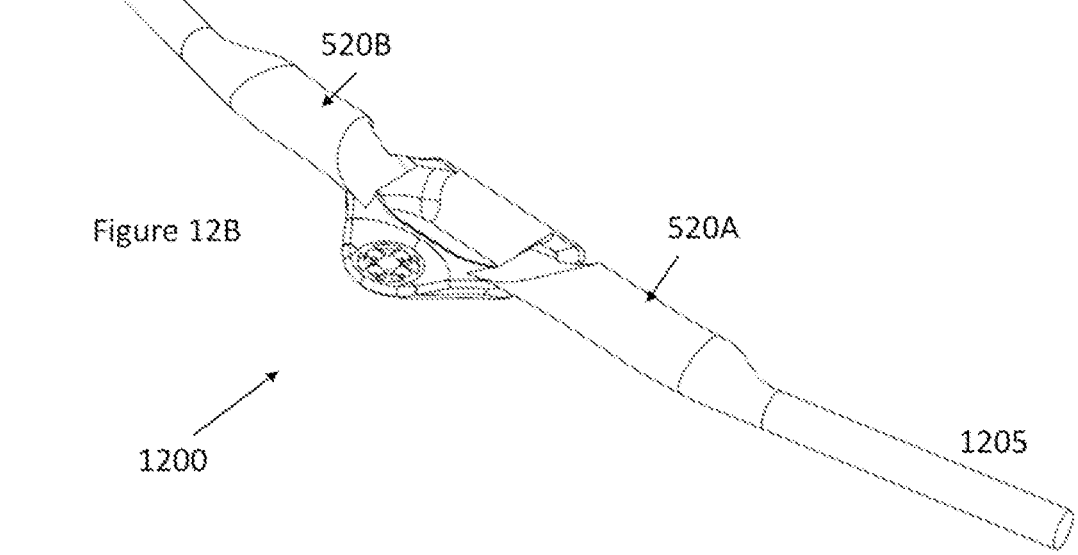

Referring next to FIGS. 12A-12D, an alternative embodiment to the mountain bike bar of FIGS. 11A-11C is shown. In particular, FIGS. 12A and 12B show perspective views while FIG. 12C shows the embodiment in front elevational view and FIG. 12D shows the embodiment in top plan view. Comparing FIGS. 12C and 12D with FIGS. 5A and 5B, it can be seen that the mountain bike bar 1200 is analogous to the road bike bar shown in FIGS. 5A and 5B, but with outer left grip 1205 and right grip 1210 better suited to mountain biking in terms of backsweep and upsweep angles. Thus, and again using like reference numerals to indicate like elements of the bar of FIGS. 5A-5B, left top portion 505 and right top portion 510 of handlebar 1200 each comprise an inner portion 515A-515B, and a central grip portion 520A-B which then transitions, respectively, to outer left and right grip portions 1205 and 1210. The grips 1205 and 1210 are, in at least some mountain bike embodiments, substantially straight but with upsweep and backsweep angles as discussed above in connection with FIGS. 11A-11C and are configured for attachment of various controls such as brakes, shifters, and so on. Grip extensions of various designs can also be attached to the outer grip portions 1205-1210.

Still referring to FIGS. 12A-12D, and particularly the portions thereof analogous to FIGS. 5A-5B, stem clamp portion 540 is positioned between the left top portion and the right top portion, and is substantially bisected by the sagittal plane 545 of the handlebar 500. A frontal bar 550 spans the gap between the front of the inner portions 515A-515B. The front bar 550 is arcuate in some embodiments, and provides a mount 555 for a cycling computer, smartphone, lights or other device. In at least some embodiments, the front bar 550 provides structural support. In some embodiments, top thumb indexes 560A-B for resting the thumbs can be provided on the inner portions of the left and right tops.

Further, in some embodiments the cavity 565 formed between the stem clamp portion 540 and the frontal bar 550 provides space for the thumb indentations to be extended down the inner walls of the cavity 565 such that the thumbs can grip the inner sidewalls 570 of the cavity 565 to provide a more secure grip—and thus safer steering—while at the same time allowing the palms and arms to relax somewhat and to save the rider's energy. As with the embodiment shown in FIGS. 2A-2B, thumb indexes 245A-245B are placed in interior side of drops 530 and 535.

As with the road bike embodiments of the present invention, the mountain bike embodiments can be constructed of carbon fiber-based materials, for example Toray T700 or a mixture of T700 and T800. Other embodiments can be made from aluminum, stainless, plastics, or other materials having the desired characteristics of strength, rigidity and acceptable weight. It will also be appreciated that, in some embodiments, the cross-section of at least the central grip portions and, optionally, the outer grip portions 1105-1110 and 1205-1210, may be ovoid in cross-section. It will be appreciated by those skilled in the art that embodiments of the mountain bike handlebar of the present invention are suitable for any type of mountain bike riding, whether competition or recreational, including cross-country, short track, downhill, enduro, gravel and so on.

The various embodiments of handlebar system of the present invention, e.g., those shown in FIGS. 2A-2B, 5A-5B, 11A-11C, or 12A-12C, may be sold as a kit (not shown) comprising a handlebar and instructions. The instructions detail functional relationships of to the structure of the invention (allowing the invention to be used, maintained, or the like in a preferred manner). Such handlebar system may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different orientations and combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

These embodiments of the invention described are exemplary, and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

It should be noted that the steps described in the method of use can be carried out in many different orders according to user preference. The use of "step of" should not be interpreted as "step for", in the claims and is not intended to invoke the provisions of 35 U.S.C. § 12(f). It should also be noted that, under appropriate circumstances, considering such issues as design preference, user preferences, marketing preferences, cost, structural requirements, available materials, technological advances, etc. or other methods.

What is claimed is:

1. A bicycle handlebar comprising:
   a stem clamp portion substantially bisected by a sagittal plane, the stem clamp portion being fixedly disposed between symmetrical left and right top portions wherein each of the left and right top portions comprises an inner portion and a central grip portion,
   the left inner portion extending forward, upward, and to the left relative to the stem clamp area and having an upper end,
   the right inner portion extending forward, upward, and to the right relative to the stem clamp area and having an upper end,
   the left central grip portion formed integrally with and connected to the left inner portion at the left inner portion's upper end and extending to the left therefrom with a slope angle relative to the sagittal plane of between five and sixty degrees and a sweep angle relative to a plane orthogonal to the sagittal plane of between four and forty-five degrees,
   the right central grip portion formed integrally with and connected to the right inner portion at the right inner portion's upper end and extending to the right therefrom with a slope of between five and sixty degrees and a sweep of between five and sixty degrees, and
   wherein the left central grip portion and the right central grip portion have a substantially wing-shaped cross-section and a cavity is formed between the left and right inner portions, and,
   a frontal bar enclosing the cavity, the frontal bar extending either between the left central grip portion and the right central grip portion or between the left inner portion and the right inner portion.

2. The bicycle handlebar of claim 1 wherein the wing-shaped cross-section has a thickness of approximately one-third of the width.

3. The bicycle handlebar of claim 1 further having left and right shoulder portion and left and right drops formed integrally with and outward from, respectively, the left and right central grip portions.

4. The handlebar of claim 1 further having a frontal bar extending between the left central grip portion and the right central grip portion and enclosing the cavity therebetween.

5. The handlebar of claim 4 having a mount formed centrally in the frontal bar, the mount configured to hold one or more cycling accessories.

6. The handlebar of claim 4 further comprising left and right shoulder portions connecting left and right drops to, respectively, outward ends of the left and right center grip portions and wherein the frontal bar is arcuate and extends forward of the left and right shoulder portions and the left and right drops.

7. The handlebar of claim 1 further having a frontal bar extending between the left inner portion and the right inner portion and enclosing the cavity therebetween.

8. The handlebar of claim 7 having a mount formed centrally in the frontal bar.

9. The handlebar of claim 7 wherein the frontal bar is configured to extends no farther forward than five centimeters beyond a front axle of a bicycle upon which the handlebar is configured to be mounted.

10. The handlebar of claim 1 further having a thumb index formed substantially at each of the junction of the left inner portion with the left central grip portion and the junction right inner portion with the right central grip portion.

11. The handlebar of claim 10 wherein thumb indices are formed in an inner sidewall of each of the left inner portion and right inner portion.

12. The handlebar of claim 1 wherein a stem is formed integrally with the stem clamp portion.

13. The handlebar of claim 1 comprised of carbon fiber-based material.

14. An integrally formed bicycle handlebar comprising:
   a stem clamp portion substantially bisected by a sagittal plane, the stem clamp portion being disposed between symmetrical left and right top portions wherein each of the left and right top portions comprises an inner portion and a central grip portion, each of the central grip portions having a substantially wing-shaped cross-section,
   the left inner portion extending forward, upward, and to the left relative to the stem clamp area and having an upper end,
   the right inner portion extending forward, upward, and to the right relative to the stem clamp area and having an upper end,
   the left central grip portion connected to the left inner portion at the left inner portion's upper end and extending to the left therefrom,
   the right central grip portion connected to the right inner portion at the right inner portion's upper end and extending to the right, and
   an arcuate frontal bar connecting the left center grip portion and the right center grip portion with a front surface that extends forward of the remainder of the handlebar.

15. The handlebar of claim 14 wherein the arcuate frontal bar comprises a mount configured to support cycling accessories.

16. The handlebar of claim 14 further comprising thumb indices on inner sidewalls of the left and right inner portions.

17. The handlebar of claim 14 further comprising left and right transition portions connecting left and right drops to, respectively, outward ends of the left and right center grip portions.

18. The handlebar of claim 14 further comprising left and right outer grip portions extending outwardly from, respectively, left and right central grip portions along a substantially straight line.

19. The handlebar of claim 18 wherein the left and right outer grip portions have upsweep and backsweep.

20. The handlebar of claim 18 wherein the left and right outer grip portions have an upsweep of up to positive 25 degrees and a backsweep of up to positive 45 degrees.

21. An integrally formed handlebar comprising
a stem clamp area having a stem clamp axis, the stem clamp area being fixedly disposed between symmetrical left and right grip portions wherein each of the left and right grip portions comprises an inner grip portion and an outer grip portion,
the left inner grip portion extending upwardly and forward relative to the stem clamp axis and to the left of stem clamp area,
the right inner grip portion extending upwardly and forward relative to the stem clamp axis and to the right of the stem clamp area,
the left outer grip portion connecting to the left inner grip portion at the left inner grip portion's most forward and upward point and extending to the left therefrom with a downward slope and a backward sweep,
the right outer grip portion connecting to the right inner grip portion at the right inner grip portion's most forward and upward point, and extending to the right therefrom with a downward slope and a backward sweep,
an arcuate frontal bar connected between the left and right grip portions substantially at the junction of the respective inner grip portions and the respective outer grip portions, a left drop affixed to the leftmost end of the left outer grip portion, and a right drop affixed to the rightmost end of the right outer grip portion.

22. The bicycle handlebar of claim 21 having a sweep in the range of 4 to 45 degrees and a slope angle in the range of 5 to 15 degrees.

23. The bicycle handlebar of claim 21 having a sweep in the range of 4 to 30 degrees and a slope in the range of 5 to 60 degrees.

24. The bicycle handlebar of claim 21 having a sweep in the range of 4 to 30 degrees and a slope in the range of 5 to 30 degrees.

25. The bicycle handlebar of claim 21 wherein a front surface of the arcuate frontal bar extends forward of the left and right drops and the left and right outer grip portions.

26. The bicycle handlebar of claim 21 wherein the outer grip portions have a wing-shaped cross-section with a cross-section width no more than three times the cross-section height.

* * * * *